(12) United States Patent
Poppitz

(10) Patent No.: US 9,400,815 B2
(45) Date of Patent: Jul. 26, 2016

(54) METHOD OF TWO PASS PROCESSING FOR RELATIONAL QUERIES IN A DATABASE SYSTEM AND CORRESPONDING DATABASE SYSTEM

(75) Inventor: Michael Poppitz, Saarbrücken (DE)

(73) Assignee: SOTFWAR AG, Darmstadt (DE)

(*) Notice: Subject to any disclaimer, the term of this patent is extended or adjusted under 35 U.S.C. 154(b) by 0 days.

(21) Appl. No.: 13/546,564

(22) Filed: Jul. 11, 2012

(65) Prior Publication Data

US 2014/0012882 A1 Jan. 9, 2014

(30) Foreign Application Priority Data

Jul. 4, 2012 (EP) .................................. 12174908

(51) Int. Cl.
*G06F 17/30* (2006.01)

(52) U.S. Cl.
CPC .... *G06F 17/30321* (2013.01); *G06F 17/30498* (2013.01); *G06F 17/30501* (2013.01)

(58) Field of Classification Search
CPC ................... G06F 17/30466; G06F 17/30501; G06F 17/30321; G06F 17/30672; G06F 17/30498; G06F 17/30958
USPC ......................................................... 707/616
See application file for complete search history.

(56) References Cited

U.S. PATENT DOCUMENTS

| | | | | |
|---|---|---|---|---|
| 5,367,675 A | * | 11/1994 | Cheng et al. | |
| 5,666,525 A | * | 9/1997 | Ross | |
| 5,802,357 A | * | 9/1998 | Li et al. | |
| 5,848,408 A | * | 12/1998 | Jakobsson et al. | 707/714 |
| 6,167,399 A | | 12/2000 | Hoang | |
| 6,185,557 B1 | * | 2/2001 | Liu | |
| 6,304,867 B1 | * | 10/2001 | Schmidt | |
| 6,411,951 B1 | * | 6/2002 | Galindo-Legaria et al. | |
| 6,505,189 B1 | * | 1/2003 | On Au et al. | |
| 6,505,205 B1 | * | 1/2003 | Kothuri et al. | |
| 6,546,394 B1 | * | 4/2003 | Chong et al. | |
| 6,615,206 B1 | * | 9/2003 | Jakobsson et al. | |
| 6,748,392 B1 | * | 6/2004 | Galindo-Legaria et al. | |
| 6,763,347 B1 | * | 7/2004 | Zhang | 711/117 |
| 7,451,144 B1 | * | 11/2008 | Koudas et al. | |
| 7,472,130 B2 | * | 12/2008 | Stern et al. | |
| 7,483,890 B2 | * | 1/2009 | Zhou et al. | |
| 7,536,379 B2 | * | 5/2009 | Purcell | |

(Continued)

OTHER PUBLICATIONS

Valduriez, Patrick. "Join indices." ACM Transactions on Database Systems (TODS) 12, No. 2 (1987): 218-246.*

(Continued)

*Primary Examiner* — Jason Liao
(74) *Attorney, Agent, or Firm* — Nixon & Vanderhye P.C.

(57) ABSTRACT

Certain example embodiments concern a computer-implemented method of processing a relational query in a database system. The relational query addresses a plurality of data objects linked by one or more relationships. For each data object addressed by the relational query, at least one result is computed in accordance with at least one index structure, with the index structure being stored in a storage device of the database system. The results computed are merged in accordance with at least one translation data structure to produce a final result of the relational query, with the translation data structure representing the one or more relationships between the data objects and being stored in a memory of the database system.

12 Claims, 10 Drawing Sheets

(56) References Cited

U.S. PATENT DOCUMENTS

Figure 1:
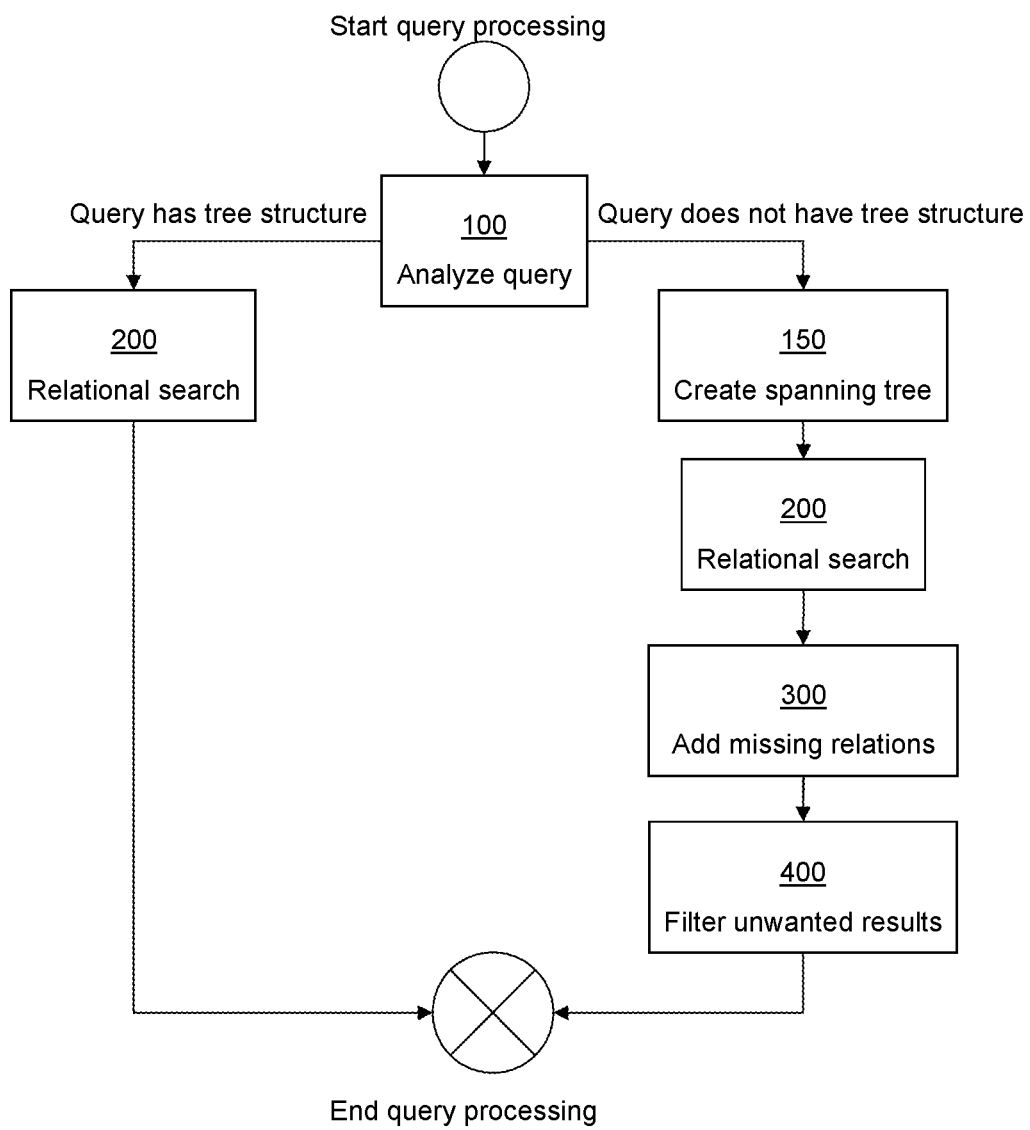

| | | | |
|---|---|---|---|
| 7,565,342 B2* | 7/2009 | Fuh et al. | |
| 7,617,179 B2* | 11/2009 | Nica | |
| 7,761,477 B1* | 7/2010 | Luo et al. | 707/803 |
| 7,882,100 B2* | 2/2011 | Andrei | 707/714 |
| 7,895,189 B2* | 2/2011 | Balmin et al. | 707/715 |
| 7,953,726 B2* | 5/2011 | Purcell | 707/714 |
| 8,103,658 B2* | 1/2012 | Flatz et al. | 707/714 |
| 8,219,552 B2* | 7/2012 | Deng et al. | 707/728 |
| 8,498,973 B2* | 7/2013 | Gutti et al. | 707/702 |
| 2002/0083039 A1* | 6/2002 | Ferrari | G06F 17/30873 |
| 2003/0167272 A1* | 9/2003 | Sinnott, Jr. | 707/100 |
| 2004/0095352 A1* | 5/2004 | Huang | G06T 13/40 345/473 |
| 2005/0198001 A1* | 9/2005 | Cunningham et al. | 707/1 |
| 2005/0198019 A1* | 9/2005 | Cunningham et al. | 707/3 |
| 2006/0136388 A1* | 6/2006 | Steinau et al. | 707/3 |
| 2007/0073759 A1* | 3/2007 | El-Sabbagh | 707/102 |
| 2008/0033914 A1* | 2/2008 | Cherniack et al. | 707/3 |
| 2008/0065590 A1* | 3/2008 | Castro et al. | 707/2 |
| 2009/0254518 A1* | 10/2009 | El-Sabbagh | 707/2 |
| 2010/0106711 A1* | 4/2010 | Graefe | 707/715 |
| 2010/0205351 A1* | 8/2010 | Wiener et al. | 711/103 |
| 2010/0306212 A1* | 12/2010 | Tsirogiannis et al. | 707/759 |
| 2012/0084322 A1* | 4/2012 | Goldstein et al. | 707/773 |
| 2012/0096054 A1* | 4/2012 | Egan et al. | 707/812 |
| 2012/0109981 A1* | 5/2012 | Graefe et al. | 707/752 |
| 2012/0124096 A1* | 5/2012 | Krishnamurthy et al. | 707/792 |
| 2012/0246146 A1* | 9/2012 | Lee | 707/714 |
| 2012/0310917 A1* | 12/2012 | Sheinin et al. | 707/714 |
| 2012/0330988 A1* | 12/2012 | Christie et al. | 707/759 |
| 2013/0013890 A1* | 1/2013 | Manner et al. | 711/207 |
| 2013/0117255 A1* | 5/2013 | Liu et al. | 707/714 |
| 2013/0151568 A1* | 6/2013 | Ellison et al. | 707/802 |
| 2013/0325902 A1* | 12/2013 | Bachar et al. | 707/797 |

OTHER PUBLICATIONS

Kocberber, Onur, Boris Grot, Javier Picorel, Babak Falsafi, Kevin Lim, and Parthasarathy Ranganathan. "Meet the Walkers." (2013).*

Norton et al., Indexing every col. In a table 9 Jul 10, stackexchange. com, stackoverflow.com/questions/3211108/indexing-every-column-in-a-table.*

McKeeman, A Short Course in Compilers—Symbol Tables and Type 2007, Dartmouth, http://www.cs.dartmouth.edu/~mckeeman/cs48/mxcom/doc/Symbols.html.*

Knuth, The Genesis of Attribute Grammars date unknown, Dartmouth, http://www.cs.dartmouth.edu/~mckeeman/cs48/mxcom/doc/AttributeGrammarHistory.pdf.*

Relational Query, http://enclopedia2.thefreedictionary.com/relational+query; Retrieved Jul. 5, 2012. 2 pages.

Inverted Index, http://en.wikipedia.org/wiki/Inverted_index; Retrieved Jul. 5, 2012, 3 pages.

P. Valduriez, "Join Indices," ACM Transactions on Database Systems, vol. 12, No. 2, Jun. 1987, pp. 218-246.

J. A. Blakeley, et al., "Join Index, Materialized View, and Hybrid-Hash Join: A Performance Analysis," Proceedings of the International Conference on Data Engineering, IEEE, Feb. 5-9, 1990, pp. 256-263.

P. O'Neil, et al., "Multi-Table Joins Through Bitmapped Join Indices," SIGMOD Record, vol. 24, No. 3, Sep. 1995, pp. 8-11, XP-002141931.

Query Processing, COMP3017 Advanced Databases 2012-2013, Nicholas Gibbons, University of Southampton, Date of publication unknown, retrieved from http://www.edshare.soton.ac.uk/id/document/278685 on Oct. 6, 2014.

* cited by examiner

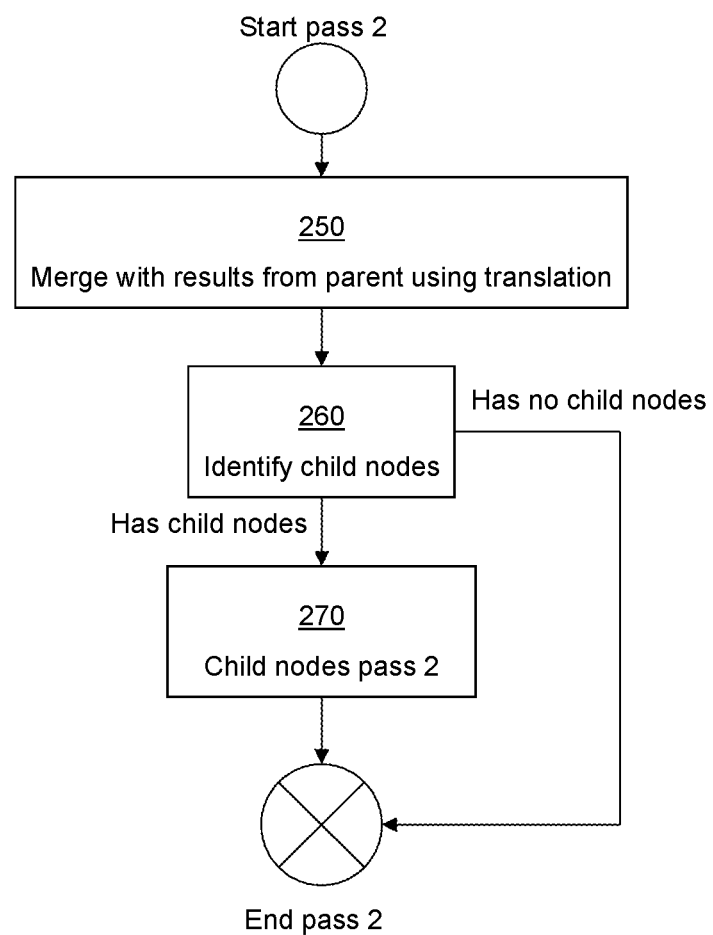

| Book | | |
|---|---|---|
| ID | Name | GenreCode |
| 1 | Chemistry Cookbook | S |
| 2 | Math for Beginners | S |
| 3 | All the Tears | D |
| 4 | End of Philosophy? | S |
| 5 | History of Mankind | S |

| BookByPublisher | | |
|---|---|---|
| ID | BookID | PublisherID |
| 1 | 1 | 1 |
| 2 | 1 | 3 |
| 3 | 2 | 2 |
| 4 | 3 | 1 |
| 5 | 4 | 2 |
| 6 | 5 | 3 |

| Publisher | |
|---|---|
| ID | Name |
| 1 | Random Books |
| 2 | Arbitrary &Co |
| 3 | Best Books |

| Genre | | |
|---|---|---|
| ID | Name | GenreCode |
| 1 | Crime | C |
| 2 | Drama | D |
| 3 | Science | S |

Fig. 9

| Book.GenreCode <-> Genre.GenreCode ||
|---|---|
| Book ID | Genre ID |
| 1 | 3 |
| 2 | 3 |
| 3 | 2 |
| 4 | 3 |
| 5 | 3 |

| Book.ID <-> BookByPublisher.BookID ||
|---|---|
| Book ID | BookByPublisher ID |
| 1 | 1 |
| 1 | 2 |
| 2 | 3 |
| 3 | 4 |
| 4 | 5 |
| 5 | 6 |

| BookByPublisher.PublisherID <-> Publisher.ID ||
|---|---|
| BookByPublisher ID | Publisher ID |
| 1 | 1 |
| 2 | 3 |
| 3 | 2 |
| 4 | 1 |
| 5 | 2 |
| 6 | 3 |

Fig. 11a (Prior Art)

| Book.ID | Genre.ID |
|---------|----------|
| 1 | 3 |
| 2 | 3 |
| 4 | 3 |
| 5 | 3 |

Fig. 11b (Prior Art)

| Book Row | Genre Row | BookByPublisher Row | Publisher Row |
|----------|-----------|---------------------|---------------|
| 1 | 3 | 1 | 1 |
| 1 | 3 | 2 | 3 |
| 5 | 3 | 6 | 3 |

METHOD OF TWO PASS PROCESSING FOR RELATIONAL QUERIES IN A DATABASE SYSTEM AND CORRESPONDING DATABASE SYSTEM

This application claims priority to EP 12 174 908.9 filed 4 Jul. 2012, the entire contents of which is hereby incorporated by reference.

1. TECHNICAL FIELD

Certain example embodiments of the present invention relate to a method of processing relational queries in a database system, as well as to a corresponding database system.

2. BACKGROUND AND SUMMARY

Nowadays, data-intensive computer systems typically store their data in databases and database systems are provided which allow storing the data into the database, as well as accessing the stored data.

Accessing data of a database is typically performed by formulating queries in a query language and having the database system process the query. Since complex databases typically store excessive amounts of data, sometimes even millions of individual data objects, many approaches have been developed for increasing the performance of the query processing to allow users to retrieve the searched data as fast as possible.

Figures 7, 8:
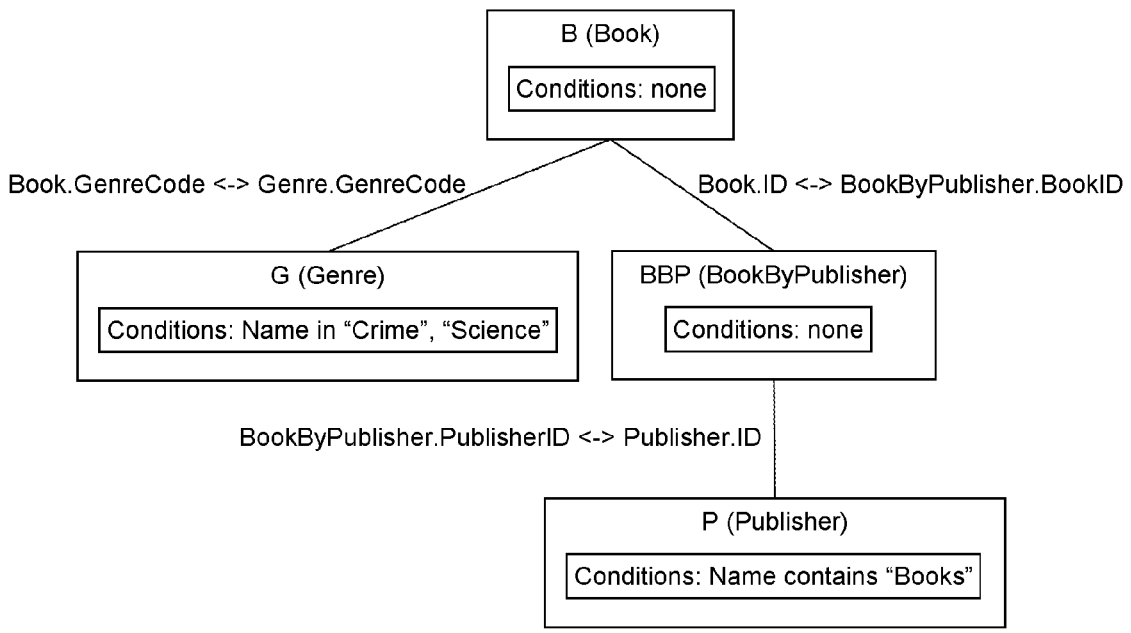

The most common conventional database systems are so-called relational database management systems (RDBMS). A common language for interacting with data stored in such RDMBS is the Structured Query Language (SQL) commonly known in the art. The theoretical concept of a relational database is based on a set of mathematical terms, wherein the most important is called relation. A relation is a mathematical description of a table and a relational database may be considered as a set of tables. Each row (also referred to as tuple) of a table comprises a data record (hereinafter also referred to as "data object" or "database object"), wherein the record comprises one or more attributes. The attributes correspond to the columns of the table. FIG. 7 shows a simple example of a relational database having a table "Book". As can be seen, the table "Book" stores in this example five data objects (rows) representing five books. Each book has an ID, a name and a genre code, which are stored in the columns of the table.

In order to retrieve data from such a relational database, queries are typically formulated in a declarative manner. This means that the query does not specify the steps the RDBMS is supposed to perform in order to retrieve the desired result. Rather, the query only specifies, in the form of a pattern, the properties of the desired result by means of one or more search conditions. A simple example of a query would thus be "Give me all books which have the term 'history' in their name". As known in the art, more complex queries can be formulated on multiple attributes, which may be combined using logical operators.

Besides simple queries involving search conditions directed only to one type of object (i.e. to one single database table), more complex queries oftentimes involve multiple objects having relations defined therebetween. As an example, consider the query "Give me all books which have the term 'history' in their name and the genre 'Science'". As can be seen, this query involves two separate tables of the exemplary database of FIG. 7 (namely the tables "Book" and "Genre"), wherein each data object in "Book" is related to one or more data objects in "Genre" and vice versa. Such queries involving multiple objects and the relations therebetween are hereinafter referred to as "relational queries."

Large databases are typically stored on hard drives or other suitable permanent storage devices. As a result, traditional relational databases typically suffer from the relatively slow disk storage access for processing queries to the database. One main reason for the hard drive access being so slow is the random access to the tables. In other words, entries of the tables are typically not accessed in sequence, but rather in random order (depending on the information searched), which requires many movements of the head of the hard disk.

Some traditional relational databases try to improve performance by reading entire blocks from disk to a cache memory, hoping other entries in the block might be needed later on. However, because following relations in a query typically results in random access to the database tables, this strategy performs poorly on larger databases with many small rows.

Other commercially available products employ so-called No-SQL databases. Most vendors of such databases do not offer any support for relational queries at all. Others try to resolve relationships by creating special indexes for each relational query which can possibly be performed. This approach, however, is limited to scenarios with a small and fixed set of conceivable relational queries and is hardly practical in more complex scenarios.

Lastly, also in-memory databases exist, which can quickly process relationships because all data is loaded in a fast memory, such as a cache or random access memory (RAM). However, this approach requires large quantities of memory, which greatly limits the scalability do to the hardware limitations in modern computer systems.

Relational database systems (RDBMS) can be considered to be the most prominent architecture used nowadays. While RDBMS are generally able to perform complex relational queries, there are scenarios in which they deliver poor results. In particular, performance breaks down as soon as the system has to perform random disk access(es). This is typically the case when the following criteria are met: data involved in querying does not fit into memory (e.g. RAM), queries operate on many rows, and/or queries use joins across multiple tables.

Under these conditions, the person skilled in the art will appreciate that a RDBMS will have to resolve many foreign keys using row lookups in a non-cached table, causing a large number of random disk accesses. On mechanical hard drives, this will cause slow head movements, resulting in long query execution times and poor disk access efficiency.

It is therefore the technical problem underlying certain example embodiments to provide an approach for processing queries (in particular relational queries which take into account relationships between the data objects to be retrieved) which is more efficient and allows a faster retrieval of the searched data, thereby at least partly overcoming the above explained disadvantages of the prior art.

This problem is according to one aspect of the invention solved by a computer-implemented method of processing a relational query. In the embodiment of claim 1, the relational query addresses a plurality of data objects linked by one or more relationships and the method comprises the following steps:

a. for each data object addressed by the relational query, computing at least one result in accordance with at least one index structure, the index structure being stored in a storage device of the database system; and b. merging the results computed in step a. in accordance with at least one translation data structure to produce a final result of the relational query, the translation data structure representing the one or more relationships between the data objects and being stored in a memory of the database system.

Accordingly, the embodiment defines a particularly efficient approach for processing relational queries, which is on the one hand based on traditional indexing technologies. Such index technologies are used in certain example embodiments for computing the results of the individual data objects addressed by the relational query. Preferably, the at least one index structure of certain example embodiments is an inverted index, which is used to store attributes of data objects and allows a quick retrieval of all objects which have specific values in specific attributes. Such inverted indexes are known in the prior art (cf. e.g. Wikipedia "Inverted index". Furthermore, each data object stored in the database preferably comprises a unique identifier (ID), which is returned as result of the index lookup operation.

The above-described indexing technologies allow performing search queries with conditions on multiple attributes of a single data object which can be combined using logical operators. These queries are typically resolved by splitting them up into individual index lookups. Object identifiers returned by the individual lookups are then merged, as indicated by the logical operators in the query to get the final result (e.g. if the query connects two search conditions with a logical "AND", the merged result is the intersecting set of the partial results of the index lookups, a logical "OR" corresponds to union set of the partial results, and so on).

As the skilled person will appreciate, these queries can be executed with good performance, since indexes can quickly produce all object identifiers for a given value and the merging of object identifiers according to the query structure requires no additional disk access. However, these search queries are limited to combinations of attributes of one single object. They especially cannot handle scenarios where a plurality of objects which have relationships between them are involved and wherein these relationships have to be considered in the query, i.e. they cannot handle relational queries, as concerned by certain example embodiments.

The mechanism proposed by certain example embodiments solves this problem by combining, i.e. merging, multiple search queries as described above by defining relational conditions between them, thus allowing to perform sub-graph searches heeding the relationships as well as object attributes.

This is achieved by introducing a translation mechanism which can translate object identifiers across relations. This translation mechanism is used in the merging step of certain example embodiments, where the computed results corresponding to the individual data objects are combined/merged in accordance with special translation data structures, which represent the relationships between the data objects stored in the database. As the person skilled in the art in database programming will appreciate, the term "computing at least one result" also encompasses the "empty set" as a result, since a database query might well produce no results for any query node or even the entire query.

Translation allows converting results from query conditions across relationships defined in the query, making them easily comparable and therefore searchable. Importantly, the translation data structures are kept in memory of the database system and only describe which object is related to which other object. Preferably, the translation data structures utilize primitive and compact identifiers and space efficient lookup techniques, such as binary search. Because no object data is kept in memory (note that the corresponding index structures are stored in a storage device of the database system), the translation structure is much smaller than the on-disk index in many scenarios.

In summary, certain example embodiments advantageously combine the advantages of storage devices (e.g. a hard disk of the underlying computer system, or any other type of permanent storage) and memory (i.e. fast memory, such as a random access memory (RAM) of the underlying computer system) while at the same time avoiding the disadvantages of both types of storage/memory. As the person skilled in the art of computer science will appreciate, the advantage of storage devices is its huge capacity and decent data streaming performance. Its disadvantage is its slow seek time, delivering poor random I/O performance. Memory, on the other hand, has limited capacity, but outstanding random I/O performance. In certain example embodiments, object data only exists on the storage device (by means of the index structures) and all random access is moved to the memory at the same time.

Accordingly, during processing the relational query, data on disk is only accessed in its indexed form for reading results for individual query conditions. This means that disk data access cost is almost linear to the number of query conditions, just like in conventional index search algorithms (good disk data streaming performance greatly reduces the impact of larger data graphs where each index entry has more result object identifiers stored). On the other hand, the handling of the random access pattern caused by following relationships is completely left to the translation mechanism. This mechanism is isolated from any object data and solely performs object ID translations according to the translation data held in memory.

In one aspect of the present invention, the method comprises the further step of representing the relational query as a query tree, wherein each data object addressed by the relational query is represented as a node of the query tree and wherein each relationship between the data objects is represented by an edge in the query tree. Representing the relational query in a tree format is a prerequisite of particularly advantageous aspects for processing the query, as will be explained further below. Most relational queries can be directly represented as query trees. However, if the relational query corresponds to a more generic connected graph, the method preferably produces a spanning tree based on the connected graph, as will be explained in the detailed description further below.

Preferably, the method further comprises the step of performing the above-described computing step and/or the merging step as part of a first pass of processing the query tree, wherein the first pass is performed recursively for each node of the query tree. During the first processing pass, the merging step preferably comprises merging the results of the current node with the results of the child node(s) of the current node. Most preferably, the method also comprises performing a second merging step as part of a second pass of processing the query tree, wherein the second pass is performed recursively for each node of the query tree, and wherein the second merging step preferably comprises merging the results of the current node with the results of the parent node of the current node. Accordingly, in a preferred embodiment of the invention, the query tree is traversed two times (i.e. in a first and a second pass), wherein the partial results of the individual data objects are first merged in the direction of the parent node and then in the direction of the respective child nodes. Moreover, the first pass and optionally the second pass of processing the query tree may traverse the query tree starting at the root node in a depth-first manner. This approach guarantees that at first, valid results are obtained for parent nodes of leaf nodes and afterwards for their parent and so forth all the way to the root node during the first pass. Determining the result for a parent based on its children delivers a result which is only missing the relation from the parent of the parent. Once the root node is reached, however, the result for it is complete and correct, because the root node has no parent of its own. The second pass will simply apply the missing parent relation to the children going downward from the root node. It is noted that the second pass may be performed equally well in a depth-first manner or a breadth-first manner.

Alternatively or additionally, for two given data objects which are addressed by the relational query and which are linked by a relationship, the translation data structure may comprise a mapping of an identifier of the first data object to an identifier of the second data object in accordance with the relationship. If the relationship is represented as a data object in a database of the database system, the translation data structure may comprise a mapping of an identifier of the first data object to an identifier of the second data object and to an identifier of the relationship. As already mentioned above, the provided translation data structures, by means of mapping the identifiers (IDs) of the respective data objects and/or relationships, is particularly compact, yet efficient.

Certain example embodiments also concern a computer program comprising instructions for implementing any of the above-described methods. Lastly, also a database system is provided, the database system comprising an interface, adapted for receiving relational queries which address a plurality of data objects linked by one or more relationships; a storage device, adapted for storing at least one index structure; a memory, adapted for storing at least one translation data structure, the translation data structure representing the one or more relationships between the data objects; and a control logic, adapted for, for each data object addressed by the relational query, computing at least one result in accordance with the at least one index structure, and for merging the computed results in accordance with the at least one translation data structure to produce a final result of the relational query.

Further advantageous modifications of embodiments of the database system of certain example embodiments are defined in further dependent claims.

3. SHORT DESCRIPTION OF THE DRAWINGS

Figure 2:
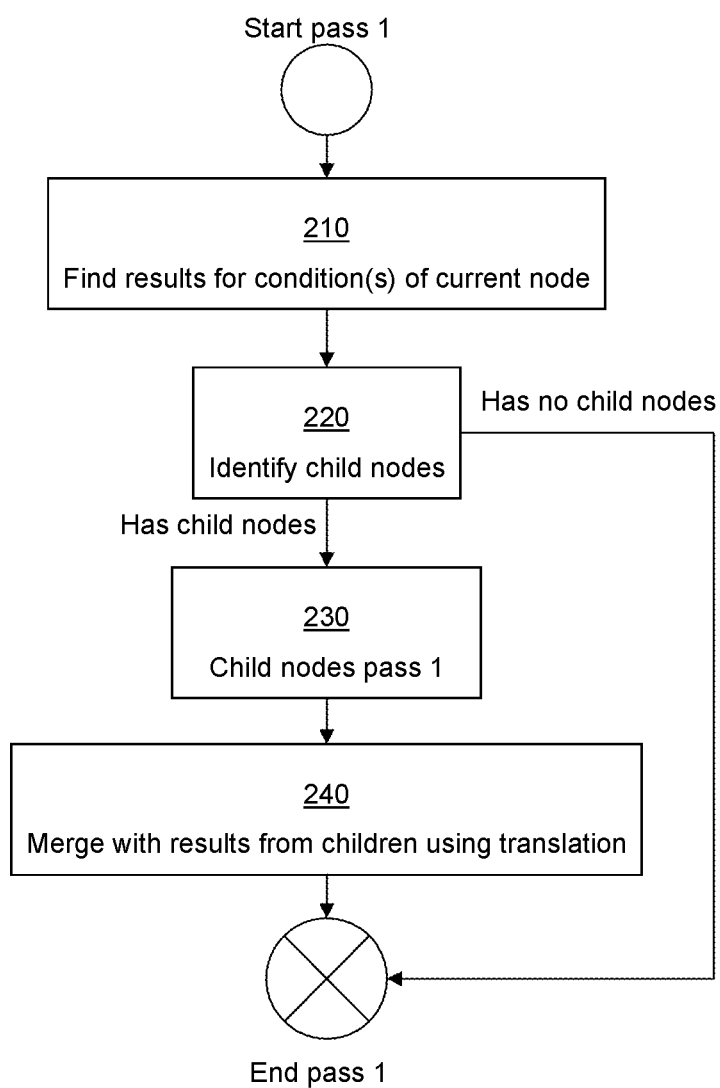
Figure 4A:
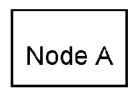
Figure 4B:
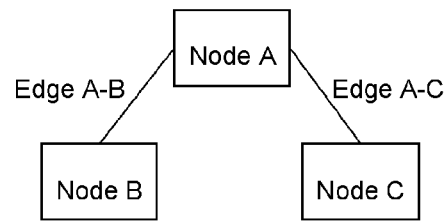
Figure 4C:
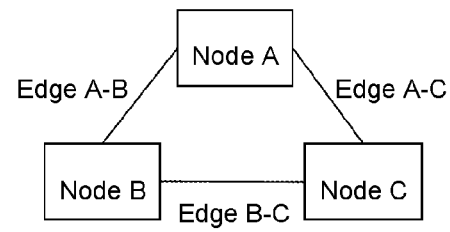
Figure 5:
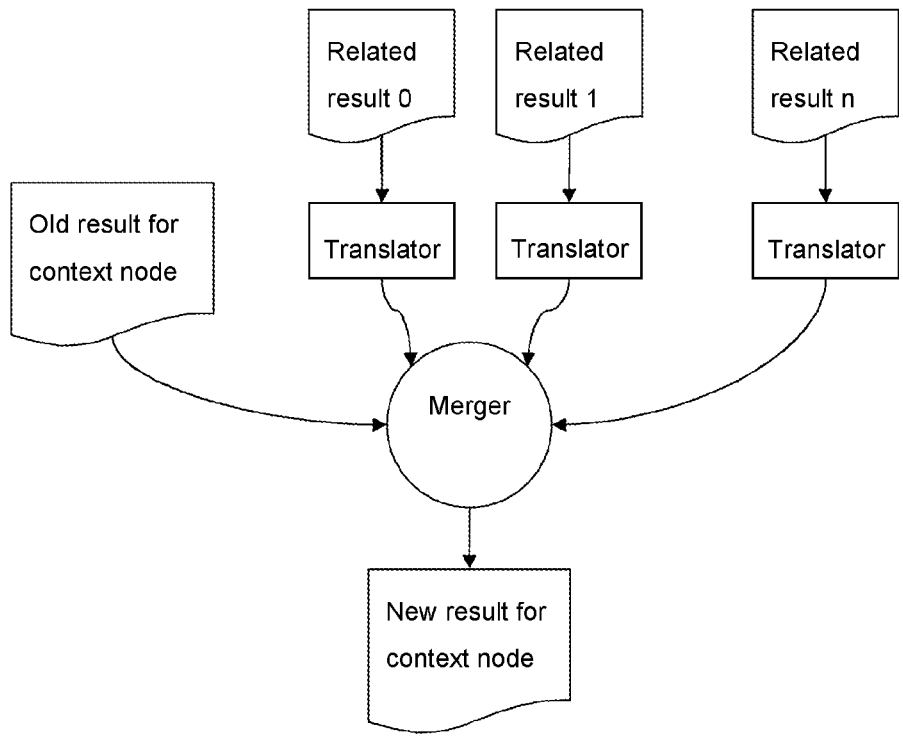
Figure 6A:
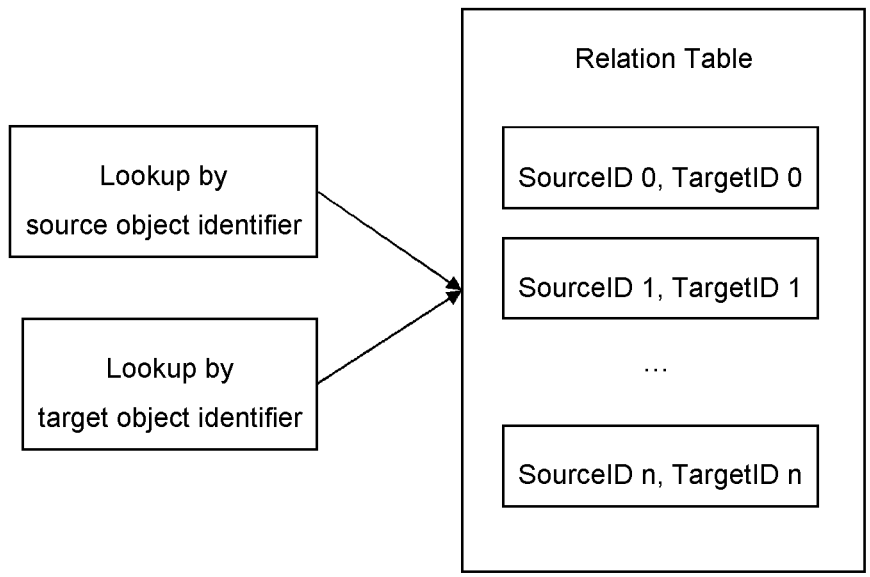
Figure 6B:
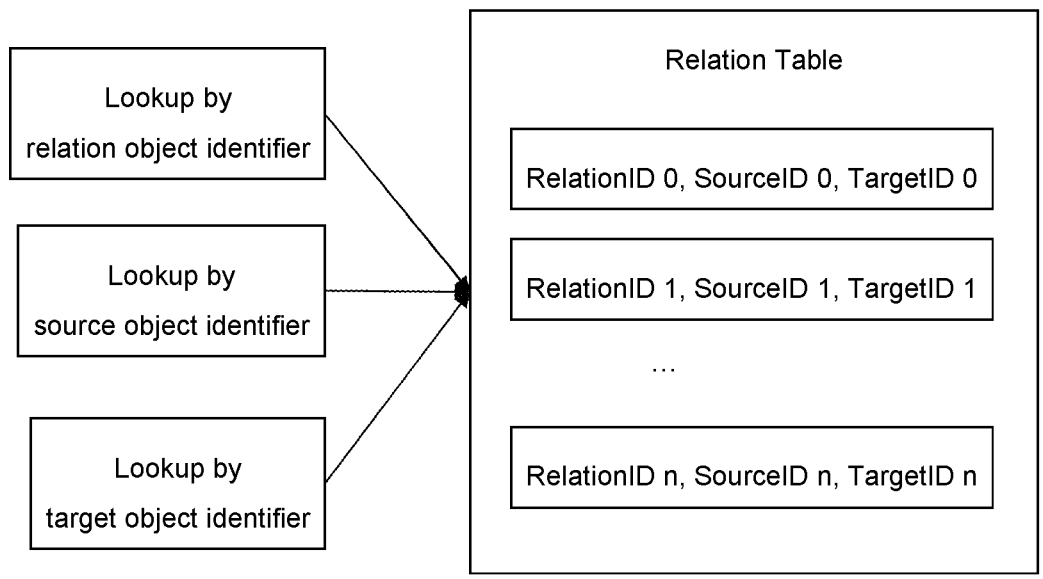
Figure 10A:
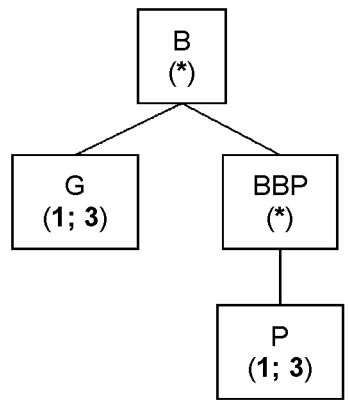
Figure 10B:
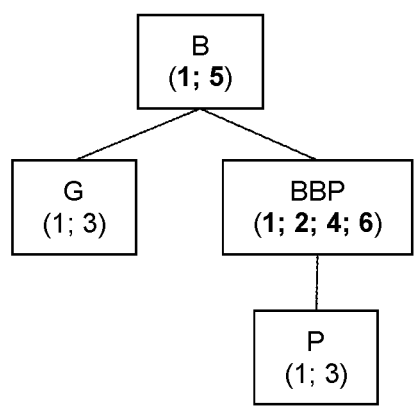
Figure 10C:
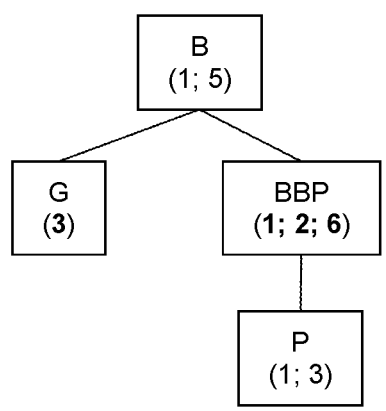
Figure 12:
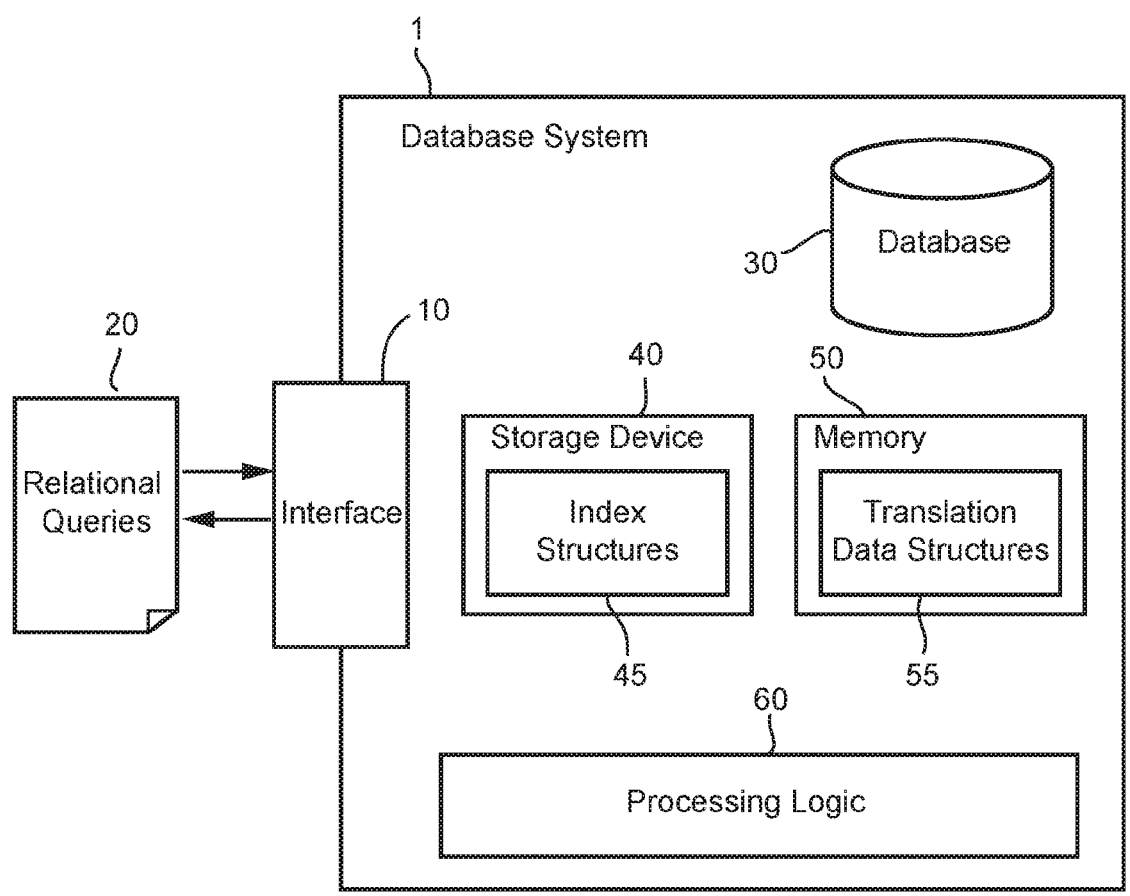

In the following detailed description, presently preferred embodiments of the invention are further described with reference to the following figures:

FIG. 1: A flow chart illustrating a query processing method in accordance with an embodiment of the invention;

FIG. 2: A flow chart illustrating the first pass comprised in a query processing method in accordance with an embodiment of the invention;

FIG. 3: A flow chart illustrating the second pass comprised in a query processing method in accordance with an embodiment of the invention;

FIGS. 4a-c: Schematic representations of types of queries which can be processed by certain embodiments of the invention;

FIG. 5: A schematic view of the data flow involved in the merge step in accordance with an embodiment of the invention;

FIGS. 6a-b: Schematic illustrations of translation data structures used in an embodiment of the invention;

FIG. 7: A schematic view of data stored in an exemplary database;

FIG. 8: A query tree representing an exemplary relational query;

FIG. 9: Translation tables generated for the exemplary database of FIG. 7 in accordance with an embodiment of the invention;

FIGS. 10a-c: Schematic views of a result tree generated when the exemplary query tree of FIG. 8 is processed in the database of FIG. 7 in accordance with an embodiment of the invention;

FIGS. 11a-b: Schematic views of intermediate results generated when the exemplary query tree of FIG. 8 is processed in the database of FIG. 7 in accordance with the prior art; and FIG. 12: A block diagram illustrating a database system in accordance with an embodiment of the invention.

4. DETAILED DESCRIPTION

In the following, a presently preferred embodiment of the invention is described with respect to a method as schematically shown in FIG. 1, which illustrates the steps of the query processing (including pre-processing steps (cf. the steps 100 and 150) and post-processing steps (300 and 400)). The described method is preferably performed by a processing logic 60 within a database system 1 schematically shown in FIG. 12. As can be seen, the database system 1 comprises an interface 10 for receiving relational queries 20, as well as a database 30, in which the data objects to be searched are stored. Further, the inventive database system 1 comprises two helper structures, namely index structures 45 and translation data structures 55, the purpose of which will be described in more detail further below. Importantly, the index structures 45 are stored in a storage device 40 of the database system 1, whereas the translation data structures 55 are stored in a memory 50 of the database system 1.

Returning to FIG. 1, the relational query 20 is initially analysed in step 100 to determine whether it already is in tree form.

Generally, a query (such as queries formulated in a declarative language, as used herein) can be represented as a graph in the mathematical sense, i.e. as a set of objects where some pairs of the objects are connected by links. The interconnected objects are referred to as vertices or nodes of the graph, and the links that connect pairs of nodes are called edges. A graph may comprise any number of nodes and edges.

When a query is represented as a graph, zero or more search conditions may be attached to each node and edge. Preferably, each node and edge also has a unique name. On a single node/edge, multiple search conditions may be combined using logical operators (such as AND, OR, XOR, and the like). The search conditions describe which data object(s) stored in the database should be considered as result(s) for the individual nodes and edges. The way in which the edges connect the nodes defines the relations which must also be fulfilled by the result.

As used herein, a query 20 received by the database system 1 of certain example embodiments may have one of three typical appearances which are relevant to the search implementation. The three appearances are schematically shown in FIGS. 4a-c, and include an exemplary query with only a single node in FIG. 4a (called "simple/non-relational"), an exemplary query with three nodes A, B, C and edges between A-B and A-C, respectively in FIG. 4b (called "tree"), and an exemplary query with three nodes A, B, C and edges between A-B, A-C and B-C in FIG. 4c (called "connected graph").

Returning to step 100 in FIG. 1, the analysis of the query 20 would result in the determination that the query in FIG. 4b already is in tree form (in mathematical graph theory, a tree is a connected graph without cycles). Simple queries without any relations, such as the one shown in FIG. 4a, are also treated as tree (namely a tree with only one node, the root node, and zero edges). Thus, if the query has a tree structure, the method proceeds to step 200 (relational search; see below).

The query in FIG. 4c is not in tree form, but forms a more generic connected graph. In this case, the method proceeds to step 150, where the query graph is converted into a spanning tree, which is then used for the actual relational search in step 200 (see below). Ideally, the generated spanning tree has many leaves with highly selective criteria and therefore few results, as this reduces the number of translations needed in the first pass of the algorithm. Unconnected query graphs, i.e. queries comprising multiple sub-graphs which are not connected by an edge (in the mathematical sense of a forest) can be handled by performing a separate search for each individual connected graph.

In step 200, the actual relational search takes place. Generally speaking, a result tree is in this step filled with matching objects using the mechanisms described further below. The result tree has the same node and edge structure as the query and preferably also uses the same unique name(s) as specified in the query. Each node and edge is equipped with a set of result items which reflect the matching objects for this node or edge. The result item comprises the object identifier and a reference to all related nodes including the edge through which this relation is established.

The relational search on the query tree (step 200) is preferably performed in two passes, which are described in the following with reference to FIGS. 2 and 3. Both passes preferably process the query tree recursively, depth first (in the mathematical sense of a Depth-First Search; DFS) and start at the root node of the query tree. Alternatively, the second pass may be performed in a Breadth-First manner. The respective node which is currently investigated (i.e. the root node in the first processing iteration, the first child of the root node in the second processing iteration, etc.) is hereinafter referred to as "current node" or "context node".

The steps of the first pass are schematically shown in FIG. 2. Step 210 involves finding the result(s) for the condition(s) which the query defines for the current node. The object identifiers of database objects matching the condition(s) of the current query node are computed, preferably using traditional inverted index 45 search technologies. As the person skilled in the art will appreciate, the matching database objects could alternatively also be determined by scanning the database, however, at the cost of efficiency. In the subsequent step 220, the child node(s) of the current node is/are identified. If the current node does not have any child nodes (i.e. it is a leaf node of the query tree), the first pass ends. If, on the other hand, the current node has one or more child nodes, the first pass is now performed for each child node (step 230)—hence the recursivity of the relational search of certain example embodiments. In step 240, the results from the search on the current node are merged with the results from the children, which is performed using object identifier translation techniques described further below.

The steps of the second pass are schematically shown in FIG. 3. In step 250, the results for the current node which were obtained in the first pass are now merged with the results for its parent node using object identifier translation techniques described further below. This step is skipped for the root node (since by definition the root node has no parent node). In the subsequent step 260, the child node(s) of the current node is/are identified. If the current node does not have any child nodes (i.e. it is a leaf node of the query tree), the second pass ends. If, on the other hand, the current node has one or more child nodes, the second pass is now performed for each child node (step 270)—hence the recursivity of the relational search of certain example embodiments.

In summary, a preferred embodiment of the present search method traverses the query tree two times starting from the root node in a recursive depth-first manner. In the first pass, the merging operation is performed in the direction from the leave nodes to the root node. In the second pass, the merging is performed in the direction from the root node to the child nodes.

Referring again to FIG. 1, if the query was originally not in tree form (see above), missing relations are added in step 300. By using the object translator mechanisms disclosed herein, matching relations are added to the result for all relations from the original query which are not part of the spanning tree created above. Subsequently, the method proceeds to step 400, where unwanted results are filtered, i.e. all objects which do not match the original query are removed from the result. Note that this operation can be performed completely in-memory 50, as all necessary data was already put together by the relational search and the previous step.

Merge and Translation

The merging steps (cf. step 240 in the first pass of FIG. 2 and step 250 in the second pass of FIG. 3) are crucial steps in the above-described two query processing passes.

Each edge in the query graph defines a relation between two nodes. The impact such relations have on the results for the nodes they connect can be controlled. For both nodes in relation, the query may define whether the existence of a relation for an object in the result is either required or optional. This way, the following behaviours can be achieved for two connected nodes A and B:

| Node A | Node B | SQL equivalent | Description |
|---|---|---|---|
| required | required | inner join | Only those objects will be in node A and B which are related to at least one object in the other node |
| optional | required | left outer join | Results of node A are not affected. Only those results remain for node B which are related to an object in the result of node A |
| required | optional | right outer join | Results of node B are not affected. Only those results remain for node A which are related to an object in the result of node B |
| optional | optional | full outer join | Results for node A and B are not affected by the relation (difference to not defining a relation at all: relations will be added to the result for those objects which have them) |

The merge step is always performed in the context of a single node. It is based on the current results of this node, which originate from the results for the node condition(s). It only considers those relations which are marked as required for the context node.

In order to be able to process results of related nodes together with results for the context node, the results of the related nodes have to be translated. In this step, the translator looks up matching relations using the result object identifiers from a related node. Using these relations it can easily find out the object identifier on the other side of the relation. These identifiers are passed on to the merger.

The merger removes all object identifiers from the result of the context node which do not appear in all translator results. As a result of this, only those results remain which fulfil all required relations. The respective dataflow of this process is schematically shown in FIG. 5.

In order to look up matching relations, the translator uses certain translation data structures 55 provided by certain example embodiments. Here, two cases have to be looked at: relations which are not explicitly represented by objects in the database (e.g. relations defined by using foreign key techniques), and relations which are explicitly represented in the database by means of dedicated objects.

The translation data structure 55 for relations which are not represented by objects is schematically shown in FIG. 6a. As can be seen, a relation table is created, which couples the object identifiers of the respective source and target objects, thereby, providing a "helper" data structure in the database which explicitly represents the relation between the objects.

If the relation itself is already represented by an object in the data graph, the translation data structure 55 is generated as schematically shown in FIG. 6b. As can be seen, each source/target object ID couple is also correlated with the identifier of the respective relation involved.

The above-described translation data structures 55 (also referred to as "lookup data structures" or "relation tables") allow to quickly identify in which rows of the relation table relations involving a specific object identifier can be found. Depending on the nature of the object identifiers, they may be implemented as lookup tables, hash tables, using binary search or any other suitable mechanism.

As shown in FIGS. 6a and 6b, the relation table 55 comprises an entry for every relation which exists in the data graph. This entry only comprises the object identifiers of the objects involved in this relation. The columns used in the relation tables 55 shown in FIGS. 6a and 6b are:

| Name | Description |
| --- | --- |
| RelationID | Object identifier of object representing the relation data |
| SourceID | Object identifier of object on source side of relation |
| TargetID | Object identifier of object on target side of relation |

COMPARATIVE EXAMPLE

In the following, concepts of certain example embodiments are explained along a simple example involving a concrete search query 20. Further, it will be described how this search query 20 would be handled in the prior art, thereby highlighting the especially advantageous technical effects of certain example embodiments.

The example involves a database 30 comprising the tables shown in FIG. 7. As the person skilled in the art will appreciate, a relational database generally stores any number of tables, which can be understood as "datatypes" of the data stored in the database. Each table may store any number of rows, wherein each row corresponds to an individual database object (i.e. a data record). Further, each table has a number of columns, which represent the attributes of the data objects.

As can be seen in FIG. 7, the exemplary database 30 comprises a table "Book", which stores data objects representing books. Each individual book data object is represented in a row of the table. The table "Book" has three columns, which represent the attributes of the books, namely an ID (identifier) a name and a genre code. The different genres are stored in a table called "Genre", wherein each genre is defined by an ID (identifier), name and genre code. The database 30 further comprises a table "Publisher" storing data objects representing publishers with the attributes ID (identifier) and name. Lastly, a table "BookByPublisher" is provided, which stores tuples of BookID and PublisherID elements along with an ID (identifier).

The tables "Book" and "Genre" show an example of a relationship which is not explicitly defined by an own table in the database. Rather, the "Book" objects store a GenreCode attribute, thus relating the respective "Book" object to a corresponding "Genre" object. For example, the "Book" object with the name "Chemistry Cookbook" is related to the "Genre" object with the Name "Science" (due to the matching GenreCode attributes).

Furthermore the table "BookByPublisher" is an example of a junction table which relates to two other tables ("Book" and "Publisher") by containing references to their ids ("BookID" and "PublisherID").

"BookByPublisher" allows for instance to link "Chemistry Cookbook" and "Random Books" using a row containing "BookID" "1" and "PublisherID" "1".

In the present example, a search query 20 is to be processed against the above-described database. The question to be answered by the query is:

"Which books (including genre and publisher) of the genres "Crime" and "Science" have been published by a publisher who has the word "books" in his name?"

As can be seen, this query 20 searches for data which is distributed across multiple tables of the database 30, wherein the relationships between the individual objects (e.g. books, genres and publishers) have to be taken into account. Therefore, this query is a so-called relational query.

Using the commonly known Structured Query Language (SQL), the above question could be expressed as follows:
select B.ID, G.ID, P.ID
from Book B
inner join Genre G on B.GenreCode=G.GenreCode
inner join BookByPublisher BBP on B.ID=BBP.BookID
inner join Publisher P on BBP.PublisherID=P.ID
where G.Name in ('Crime', 'Science') and P.Name like '% Books %'

If the tables and references (relations) between them are expressed as a data graph as described further above, the query graph for this question would look as schematically shown in FIG. 8 (using the same aliases as in the SQL statement). As can be seen, in accordance with the conceptual description further above, each object in the query is represented by a node in the query graph and each relation is represented by an edge in the query graph.

Importantly, the node requirement is assumed to be "required" in this example (see the explanations concerning the merge and translation techniques above) for all edges and their nodes in order to achieve an "inner join" behavior. This simplifies the merge step in this example to be a simple AND operation for the different translation and condition results.

Execution of the Comparative Example by an Embodiment of the Invention

When the exemplary database 30 shown above is handled by a preferred embodiment of the present invention, certain indexes 45 and translation tables 55 are defined in a preparatory step, i.e. before the query is actually processed.

More precisely, inverted indexes 45 are defined for the following table columns, wherein the indexes 45 are stored on the permanent storage 40 (e.g. a hard disk) of the database system 1: Book.Name, Book.GenreCode, Publisher.Name, Genre.Name, Genre.GenreCode. Generally speaking, the table columns to be indexed may be configured, i.e. preferably all columns on which certain criteria are to be applied should be indexed.

In addition to the above indexes, the database system 1 creates certain translation tables 55, which are stored in a fast memory 20 (e.g. a cache or the random access memory; RAM) of the database system 1. These translation tables are schematically shown in FIG. 9. Similar to foreign key definitions in conventional databases, also the relations and thus the translation tables to be generated are configurable in certain embodiments.

As already described further above, these translation tables 55 can be navigated in both directions. For example, the translation table 55 "Book.GenreCode<->Genre.Genre-Code" allows to determine which "Book" objects are related to a specific "Genre" object based on the "GenreCode" attribute. The same table 55 also allows determining the "Genre" object relating to a specific "Book" object.

Once the above-described "helper" data structures (i.e. the indexes 45 and the translation data structures 55) are provided in the database system 1, the actual query processing can take place.

For the provided example, the pre and post processing is rather simple. Accordingly, the "Analyze Query" step (cf. step 100 in FIG. 1) determines that the query 20 (see above) already is in tree form and thus the method can proceed directly to the "Relational Search" step (cf. step 200 in the left branch of FIG. 1), more precisely to the first pass shown in FIG. 2.

As already described above, the first pass starts with the root node, which is for the given exemplary query graph the node B (cf. FIG. 8). Step 210 ("Find results for conditions of current node") does not need to do anything because node B has no conditions attached. Step 220 ("Identify child node") finds the child nodes of node B, which are the nodes G and BBP. Because there are child nodes, step 230 ("Child nodes pass 1") is now started for these child nodes one by one.

Accordingly, the first pass now starts for node G. Step 210 ("Find results for conditions of current node") determines that node G has the condition "Name in 'Crime', 'Science'" attached and thus, the genres with ID "1" and "3" are the results of this step, since these genres match the condition of having either the name "Crime" or "Science". Further, step 220 ("Identify child nodes") finds that there are no child nodes to be processed for node G. Therefore, the first pass ends for node G.

The first pass now starts for node BBP. Step 210 ("Find results for conditions of current node") does not need to do anything because node BBP has no conditions attached. Step 220 ("Identify child nodes") finds the child node P. Because there are child nodes, step 230 ("Child nodes pass 1") is now started for these child nodes one by one.

Accordingly, the first pass now starts for node P. Step 210 ("Find results for conditions of current node") finds the publishers with ID "1" and "3", which match the condition attached to node P, namely the condition of containing the word "Books". Step 220 ("Identify child nodes") finds that there are no child nodes to be processed. Therefore, the first pass ends for node P.

At this point, the first pass (cf. FIG. 2) has been started for all nodes in the query tree and all initialization was done. The result graph currently looks as shown in FIG. 10a (note that bold result elements in the Figure indicate values changed in the respective pass and "*" indicates that all objects match). As can be seen, the structure of the result tree resembles that of the query tree (as explained further above) and the intermediate results of the individual node conditions defined in the query tree are attached to the respective nodes of the result tree. For example, since the genres "1" and "3" were found to be results for node G (see above), node G of the result tree contains "(1; 3)", and so on.

The first pass now continues for node BBP. Step 240 ("Merge with results from children using translation"; cf. FIG. 2) does the following: The results for P (which is a child of BBP) are translated into results for BBP using the translation table 55 for the relation "BookByPublisher.PublisherID<->Publisher.ID" (cf. FIG. 9), which was defined in the query. This yields the entries 1, 2, 4 and 6. These entries are also the new result for BBP, because the node did not have any results restrictions yet. This ends the first pass for node BBP.

The first pass now continues for node B. Step 240 ("Merge with results from children using translation") now does the following: The translation table "Book.GenreCode<->Genre.GenreCode" used for the edge between G and B yields 1, 2, 4 and 5. The translation table "Book.ID<->BookByPublisher.BookID" used for the edge between B and BBP yields 1, 3 and 5. The current result is not restricted, and thus the new results for B are all those entries which are contained in both translation results, namely 1 and 5. The first pass has now been completed and the current result graph looks as shown in FIG. 10b. The result for the root node B is already final, all child nodes, however, can still change.

The second pass (cf. FIG. 3) now starts for the root node B. Because there is no parent node for the root node B, step 250 ("Merge with results from parent using translation") does not do anything. Step 260 ("Identify child nodes") finds two child nodes G and BBP. Thus, step 270 ("Child nodes pass 2") is now started for these child nodes one by one.

Accordingly, the second pass now starts for node G. Step 250 ("Merge with results from parent using translation") now does the following: The translation table "Book.GenreCode<->Genre.GenreCode" used for the edge between B and G, which yields 3. Merged with the current result for G, this creates the new result 3. Step 260 ("Identify child nodes") finds that there are no child nodes to be processed. Therefore, the second pass ends for node G.

The second pass now starts for node BBP. Step 250 ("Merge with results from parent using translation") now does the following: The translation table 55 "Book.ID<->BookByPublisher.BookID" is used for the edge between B and BBP, which yields 1, 2 and 6. Merged with the current result for BBP, this creates the new result 1, 2 and 6. Step 260 ("Identify child nodes") finds that there is one child node P. Because there are child nodes, step 270 ("Child nodes pass 2") is now started for this child node.

Accordingly, the second pass now starts for node P. Step 250 ("Merge with results from parent using translation") now does the following: The translation table 55 "BookByPublisher.PublisherID<->Publisher.ID" is used for the edge between BBP and P, which yields 1 and 3. Merged with the current result for P, this creates the unchanged result 1, 3. Step 260 ("Identify child nodes") finds that there are no child nodes to be processed. Therefore, the second pass ends for node G.

The second pass now continues and ends for node BBP. The second pass now continues for node B and ends. At this point, the final result of the relational search has been calculated, which is shown in FIG. 10c. Accordingly, the result tree in FIG. 10c shows that the result of the exemplary query 20 explained above ("which books of the genres "Crime" and "Science" have been published by a publisher who has the word "books" in his name?") is the books with IDs 1 and 5, i.e. the books "Chemistry Cookbook" and "History of Mankind".

It is important to note that using certain example embodiments, the given example only performs three index lookups in the first pass, namely two index lookups to find results matching the conditions for node G (one for each word) and one more for node P. All the other results are computed using only the translation tables 55. As described above, since these translation tables 55 are stored in a fast memory 20 of the database system 1, the query processing in accordance with certain example embodiments is exceptionally fast, in particular faster than executing the query 20 in accordance with conventional techniques known from the prior art, which will be shown in the following.

Execution of the Comparative Example Using Conventional Techniques

In the following, the exemplary query shown further above is processed using a conventional SQL database.

It is assumed that all columns used for lookups are indexed. Furthermore, it is assumed that row keys are used for internal data handling. These row keys are assumed to start from 1 and increase by one for each row given in the example table above (therefore, they correspond to the numeric value of the ID column by chance).

The execution plan described hereinafter is only an example. The plan built by actual database servers depends on many factors and varies between vendors. However, the problem of the many random disk accesses remains.

Step 1—Determine Books for Genres: At first, two index lookups are performed on the "Genre" table (cf. FIG. 7) for the genres "Crime" and "Science". The resulting rows 1 and 3 are read to determine the "GenreCode" for each found genre C and S. Furthermore, two index lookups are performed on the "Book" table to resolve the "GenreCodes" into rows 1, 2, 4 and 5 of the "Book" table. The intermediate result looks like shown in FIG. 11a.

Step 2—Determine Books for Publishers: An index lookup is now performed on the "Publisher" table to obtain rows matching "books". The resulting rows 1 and 3 are read to obtain the IDs 1 and 3. Now, two index lookups are performed on the "BookByPublisher" table for PublisherID 1 and 3. The resulting rows 1, 2, 4 and 6 are read to obtain the BookIDs 1, 3 and 5. On the "Book" table, three lookups are used to find the rows containing the IDs. These rows are 1, 3 and 5.

Step 3—Join Results: Finally, the rows for the "Book" table are merged together. The end result looks like shown in FIG. 11b.

As the person skilled in the art of database programming will appreciate, the above-described prior art approach of handling the exemplary query needs 3 lookups again to resolve the conditions. In addition, 7 index lookups and 8 read operations are required to perform the joins on the tables. Because the relations from other tables can typically not be reflected in the order of rows of a table, these additional lookups are randomly distributed across the index and data space and therefore show poor disk access behavior.

SUMMARY

In conclusion, it can be seen in the example that the approach proposed by certain example embodiments delivers improved performance even in this simple example. It is noted that the more data is actually processed, the bigger the advantage gets. This is because the inventive approach only needs index lookups to resolve query conditions. In other words, it only needs to stream more data per condition on large databases, but it does not need more disk seeks (note that streaming is fast, but seeking is slow). On the other hand, the traditional prior art approach typically needs an additional index lookup and row read per additional row to be considered in a relation.

While the concepts of certain example embodiments have been described in the context of an exemplary database storing books, it will be appreciated that the invention is not limited to this exemplary application scenario. Rather, certain example embodiments may well be used e.g. in the context of analyzing and searching business process modeling data. In addition, the same approach can be applied in many different areas where data can be represented in a relational model and relational queries need to be carried out. Certain example embodiments allow one to quickly identify all contents including relations which match a certain pattern. The pattern itself is represented as related items. Each item in the query can have criteria defined, and only matching contents are considered as instances of this item. Some example use cases include process models, which can be transformed into different representations on-the-fly by identifying all item instances which have specific relation patterns to a context node, indicating a certain semantic, users doing complex process data analysis by finding all sub-graphs which match a certain pattern graph, or relational queries performed on a NoSQL data store.

As disclosed herein, one concept of certain example embodiments is that an efficient translation mechanism is provided for handling the random access patterns involved in processing relational queries. The mechanism is isolated from the actual object data and is performed on accumulated translation data held in quickly accessible memory.

It will be appreciated that as used herein, the terms system, subsystem, service, module, control logic, program logic, programmed logic circuitry, engine, and the like may be implemented as any suitable combination of software, hardware, firmware, and/or the like. The systems described herein may include, for example, processing resources such as, for example, at least one processor and a memory, that may at least partially control software and/or other modules, etc. It also will be appreciated that the storage locations/repositories herein may be any suitable combination of disk drive devices, memory locations, solid state drives, CD-ROMs, DVDs, tape backups, storage area network (SAN) systems, and/or any other appropriate non-transitory tangible computer readable storage medium. For instance, data may be exported to a non-transitory computer readable storage medium. It also will be appreciated that the techniques described herein may be accomplished by having at least one processor execute instructions and/or applications that may be tangibly stored on a non-transitory computer readable storage medium. Similar statements apply with respect to clients, servers, and/or other elements in various network arrangements.

What is claimed is:

1. A computer-implemented method of processing a relational query in a database system that includes volatile memory and non-volatile storage, the non-volatile storage storing a database of the database system, wherein the relational query, which is represented as a query tree, addresses a plurality of data objects linked by one or more relationships that are included in the database, the method comprising:
   a. for each data object addressed by the relational query, computing, in connection with a processor, at least one result in accordance with at least one index structure, the index structure being stored in a storage device of the database system; and b. merging, in connection with a or the processor, the results computed in (a) in accordance with at least one translation data structure to produce a final result of the relational query, where each edge between nodes of the query tree includes a corresponding translation data structure that represents the one or more relationships between the data objects, the translation data structure being stored in a memory of the database system, wherein the merging further comprises at least two passes:

performing a first merging as part of a first pass of processing the query tree, wherein the first pass is performed recursively on nodes of the query tree, where results of a child node of a first node are merged, using a corresponding translation data structure included with the edge of the query tree between the first node and the child node, into results of the first node to obtain intermediate results for the first node, and performing a second merging as part of a second pass, after the first pass, of processing the query tree, wherein the second pass is performed recursively on nodes of the query tree, where the obtained intermediate results of the first node are merged, using a corresponding translation data structure included with the edge of the query tree between the first node and the child of the first node, into results of the child node to obtain results for the child node.

2. The method of claim 1, wherein the first merging comprises merging the results of each child node into the results of a corresponding parent node(s).

3. The method of claim 1, wherein the second merging comprises merging the results of each node into the results of a corresponding child node.

4. The method of claim 1, wherein the first pass and/or the second pass of processing the query tree traverses the query tree starting at the root node in a depth-first manner.

5. The method of claim 1, wherein for two given data objects which are addressed by the relational query and which are linked by a relationship, the translation data structure comprises a mapping of an identifier of the first data object to an identifier of the second data object in accordance with the relationship.

6. The method of claim 5, wherein, if the relationship is represented as a data object in a database of the database system, the translation data structure comprises a mapping of an identifier of the first data object to an identifier of the second data object and to an identifier of the relationship.

7. The computer-implemented method of claim 1, wherein during processing the relational query, data on the non-volatile storage is only accessed in indexed form for reading results for individual query conditions.

8. A non-transitory computer readable storage medium tangibly storing a computer program for processing a relational query, which is represented as a query tree, in a database system that includes at least one processor, wherein the relational query addresses a plurality of data objects linked by one or more relationships, the stored instructions comprising instructions that are configured to cause the processing system to:

for each data object addressed by the relational query, compute at least one result in accordance with at least one index structure, the index structure being stored in a storage device of the database system; and merge the results computed in (a) in accordance with at least one translation data structure to produce a final result of the relational query, where each edge between nodes of the query tree is linked to a corresponding translation data structure that represents the one or more relationships between the data objects, the translation data structure being stored in a memory of the database system, wherein the merging further comprises:

perform a first merging as part of a first pass of processing the query tree, wherein the first pass is performed recursively on nodes of the query tree, where results of a child node of a first node of the query tree are merged, using a translation data structure linked to the edge that is between the child node and the first node of the query tree, into results of the first node to obtain intermediate results for the first node, and perform a second merging as part of a second pass, after the first pass, of processing the query tree, wherein the second pass is performed recursively on nodes of the query tree, where the intermediate results of the first node are merged, using a corresponding translation data structure linked to the edge of the query tree that is between the first node and the child of the first node, into results of the child node to obtain results for the child node.

9. A database system, comprising:

a. an interface configured to receive relational queries which address a plurality of data objects linked by one or more relationships;

b. a storage device configured to store at least one index structure;

c. a memory configured to store at least one translation data structure representing the one or more relationships between the data objects;

d. control logic that, in connection with at least one processor, is configured to at least:

as part of a first pass, for each data object addressed by the relational query, compute at least one result of a first node in a query tree of the relational query in accordance with the at least one translation index structure, where each edge between nodes of the query tree is linked to a corresponding translation index structure that is stored in the memory;

as part of the first pass, merge, using a corresponding translation index structure that is linked to the edge between a child of the first node and the first node, the computed results of the child of the first node into results with results of the first node to produce an intermediate result of the relational query for the first node;

as part of a second pass that is performed after the first pass, merge, using the corresponding translation index structure that is linked to the edge between the child of the first node and the first node, the computed intermediate results of the first node into results of the child node to obtain results for the child node.

10. The database system of claim 9, wherein the first pass is performed recursively for each node of the query tree.

11. The database system of claim 9, wherein the second pass is performed recursively for each node of the query tree.

12. The database system of claim 10, wherein the first pass and/or the second pass of processing the query tree traverses the query tree starting at the root node in a depth-first manner.

* * * * *